(12) United States Patent
Yu et al.

(10) Patent No.: US 10,750,421 B2
(45) Date of Patent: Aug. 18, 2020

(54) REFERENCE SIGNAL POWER MEASUREMENT FILTERING

(71) Applicant: Intel IPCorporation, Santa Clara, CA (US)

(72) Inventors: Zhibin Yu, Unterhaching (DE); Jun Zhou, Xi'an (CN)

(73) Assignee: Apple Inc., Cupertino, CA (US)

(*) Notice: Subject to any disclaimer, the term of this patent is extended or adjusted under 35 U.S.C. 154(b) by 116 days.

(21) Appl. No.: 15/736,453

(22) PCT Filed: Jun. 25, 2015

(86) PCT No.: PCT/CN2015/082361
§ 371 (c)(1),
(2) Date: Mar. 27, 2018

(87) PCT Pub. No.: WO2016/206051
PCT Pub. Date: Dec. 29, 2016

(65) Prior Publication Data
US 2019/0342812 A1   Nov. 7, 2019

(51) Int. Cl.
*H04W 36/30* (2009.01)
*H04B 17/24* (2015.01)
(Continued)

(52) U.S. Cl.
CPC ........... *H04W 36/30* (2013.01); *H04B 17/24* (2015.01); *H04B 17/318* (2015.01); *H04W 36/08* (2013.01); *H04W 52/0245* (2013.01)

(58) Field of Classification Search
CPC . H04W 36/30; H04W 36/08; H04W 52/0245; H04B 17/24; H04B 17/318
See application file for complete search history.

(56) References Cited

U.S. PATENT DOCUMENTS

2012/0115463 A1* 5/2012 Weng ............... H04L 1/0026
455/425
2012/0264476 A1* 10/2012 Kleinhenz ......... H04L 1/0026
455/517
(Continued)

FOREIGN PATENT DOCUMENTS

CA   2756487 A1   5/2012
CN   101702696 A   5/2010
(Continued)

OTHER PUBLICATIONS

State Intellectual Property Office of P.R. China, PCT International Search Report and Written Opinion issued for PCT/CN2015/082361, 11 pgs., dated Mar. 10, 2015.

*Primary Examiner* — Ernest G Tacsik
(74) *Attorney, Agent, or Firm* — Eschweiler & Potashnik, LLC

(57) ABSTRACT

A wireless communication device and method for filtering a power measurement of a reference signal received by a wireless communication device, by measuring, with a receiver, a current reference signal power and a current cell specific reference signal (CRS) power of the reference signal; generating, by a processor, a measurement reliability coefficient based on the current reference signal power and the current CRS power; and filtering, by a filter, the current reference signal power using the generated measurement reliability coefficient to generate a filtered reference signal power, wherein the measuring, generating, and filtering are performed in a physical layer.

21 Claims, 2 Drawing Sheets

(51) Int. Cl.
*H04B 17/318* (2015.01)
*H04W 36/08* (2009.01)
*H04W 52/02* (2009.01)

(56) References Cited

U.S. PATENT DOCUMENTS

2013/0295914 A1* 11/2013 Tran ............... H04B 7/0691
  455/422.1
2016/0242052 A1* 8/2016 Kazmi ............ H04W 24/10

FOREIGN PATENT DOCUMENTS

| CN | 103220704 A | 7/2013 |
| CN | 103546929 A | 1/2014 |

* cited by examiner

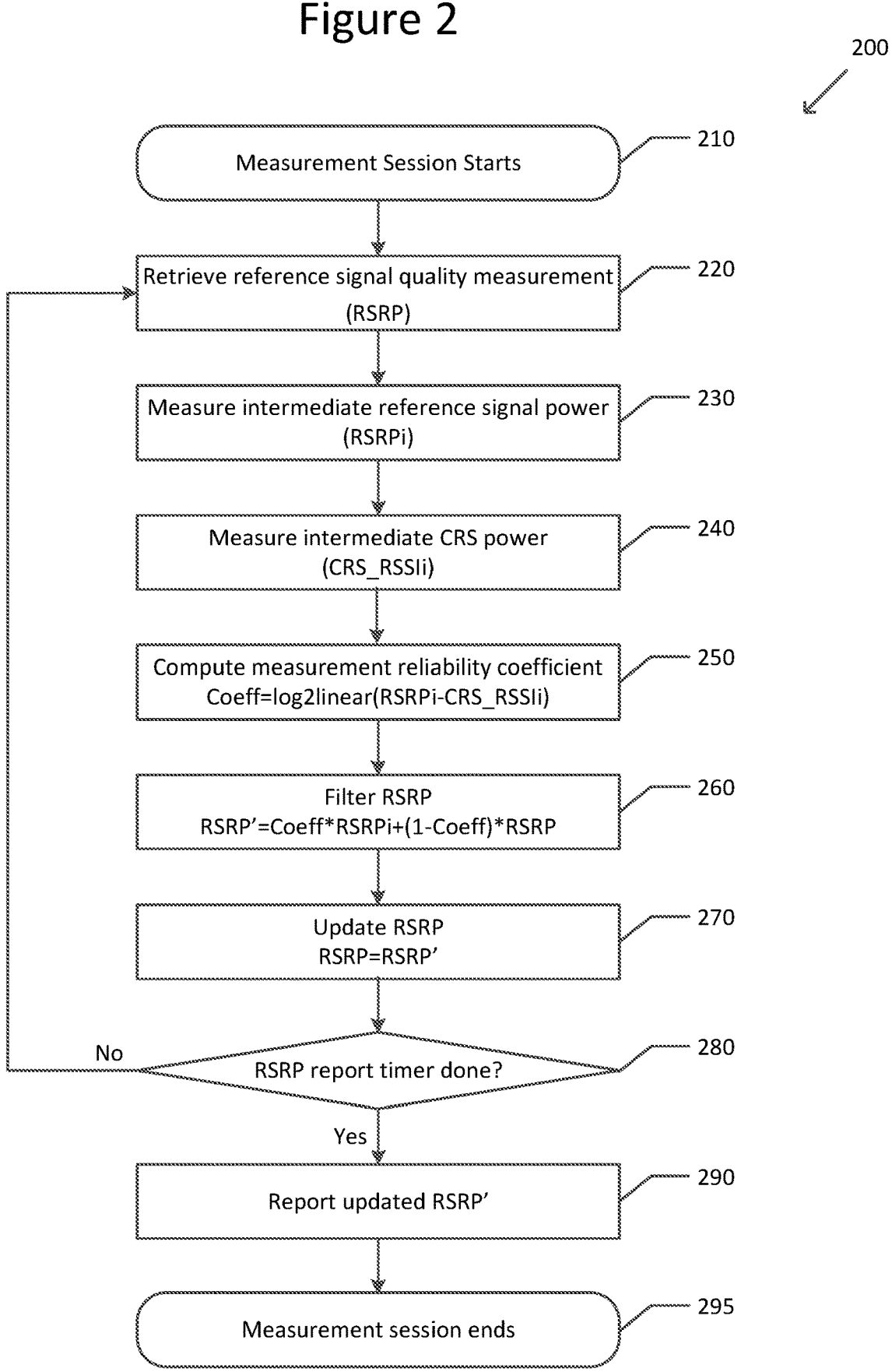

REFERENCE SIGNAL POWER MEASUREMENT FILTERING

TECHNICAL FIELD

The present disclosure generally relates to filtering in a physical layer a power measurement of a reference signal received by a wireless communication device before reporting to a higher layer.

BACKGROUND

In cellular networks, as a user equipment moves from cell to cell and performs cell selection/reselection and handover, the user equipment measures the signal strength/quality of neighboring cells. In a Long Term Evolution (LTE) network, for example, the user equipment measures two parameters of cell-specific reference signals (CRS)—RSRP (Reference Signal Received Power) and RSRQ (Reference Signal Received Quality).

The RSRP is the average received power of resource elements that carry CRS over a frequency bandwidth. Although RSRP is an important measure, on its own it provides no indication of signal quality. RSRQ provides this measure and is defined as the ratio of RSRP to the Received Signal Strength Indicator (RSSI). The RSSI parameter represents the received power for all subcarriers of the serving cell bandwidth, including the signal power, noise power, and interference power over all subcarriers. Accurate RSRP/RSRQ measurement can reduce the connection drop rate and therefore enhance user experience.

FIG. 3 illustrates a diagram of raw RSRP measurements reported from a user equipment's physical layer (L1 in the case of LTE) to a higher layer (L3 in the case of LTE), as is known. The physical layer performs raw RSRP measurements several times and then reports the measurements to the higher layer with a maximum period of 200 ms for intra-frequency measurement and 480 ms for inter-frequency measurement.

In a Radio Resource Control (RRC) connected state, the reported RSRP is time filtered in the higher layer to smooth the measurement results. The period that the physical layer reports the measurement results to the higher layer filter is relatively long. As a result, the reported measurement results may not accurately reflect the RSRP at the time stamp of reporting.

BRIEF DESCRIPTION OF THE DRAWINGS

FIG. 2 illustrates a flowchart of a method in accordance with an aspect of the disclosure.

DESCRIPTION OF THE ASPECTS

The present disclosure is directed to filtering raw reference signal power measurements in a physical layer before reporting to a higher layer. The filter coefficients are generated dynamically based on the raw reference signal power measurements.

Figure 1:
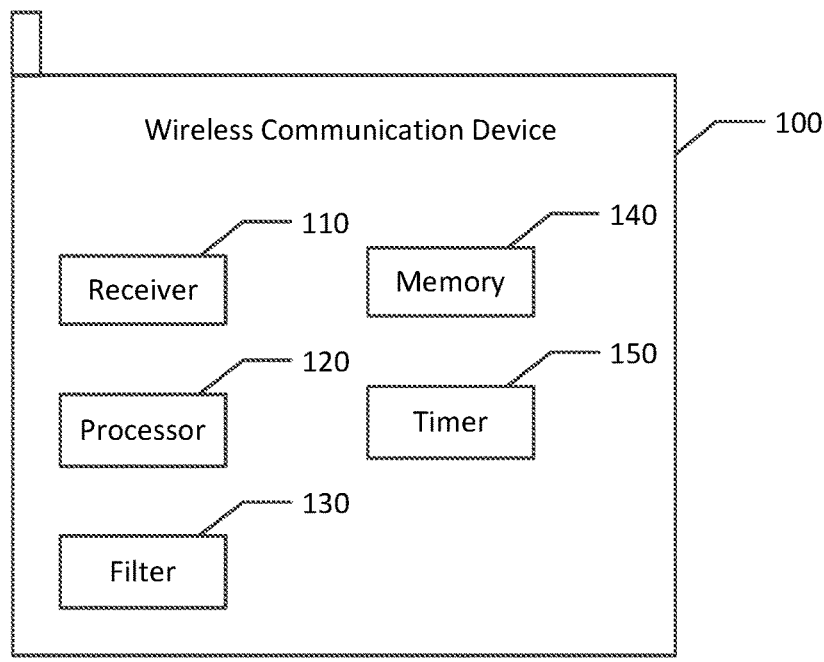
FIG. 1 illustrates a schematic diagram of a wireless communication device in accordance with an aspect of the disclosure.
Figure 3:
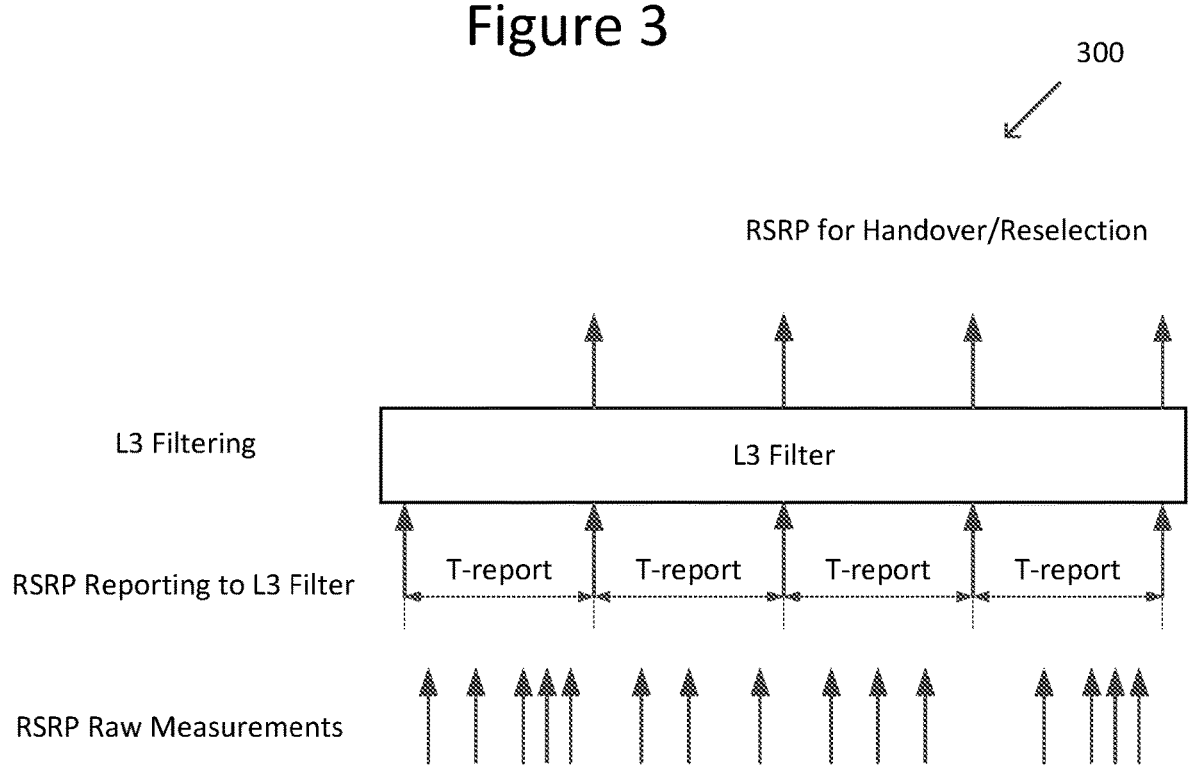
FIG. 3 illustrates a diagram of raw measurement results reported from a physical layer to a higher layer.

FIG. 1 illustrates a schematic diagram of a wireless communication device 100, and FIG. 2 illustrates a flowchart 200 of a method for adaptively filtering a reference signal received in the wireless communication device 100. FIGS. 1 and 2 will be described in conjunction below.

The wireless communication device 100 comprises a receiver 110, a processor 120, a filter 130, a memory 140, and a reference signal quality report timer 150.

For the sake of explanation, the aspects of the disclosure will be described in context of a Long Term Evolution (LTE) network, though the disclosure is not limited in this respect. The disclosure is applicable to 3G networks or any type of communications network having a reference signal.

A measurement session starts at Step 210 when a physical layer (L1 in the context of LTE) receives from a higher layer (L3 in the context of LTE) a measurement request. The "measurement session" is a time interval between a last reporting by the physical layer to the higher layer. During the measurement session the wireless communication device 100 schedules multiple intermediate measurements for a same frequency band for a same cell, whether a serving cell or a neighboring cell.

At Step 220, the processor 120 retrieves from the memory 140 any previously-stored reference signal power measurement. In the context of LTE, the reference signal power is Reference Signal Received Power (RSRP). The memory 140 may be any type of known memory suitable for the intended purpose.

At Step 230, the receiver 110 measures an intermediate reference signal power RSRPi of the received reference signal. An intermediate measurement is defined in this disclosure as a current measurement that has not been reported and is used in a filtering calculation, as described below, to generate a more reliable report.

At Step 240, the receiver 110 measures an intermediate CRS power CRS_RSSIi, which is the total power on a CRS subcarrier of the particular cell's bandwidth, including CRS signal power, noise power, and interference power on the CRS ports. The intermediate CRS power CRS_RSSIi is a new metric not defined in the wireless communication standards. The intermediate CRS power CRS_RSSIi is always larger than the intermediate reference signal power RSRPi in the presence of noise and interference. When there is no interference or noise, the intermediate CRS power CRS_RSSIi is equal to the intermediate reference signal power RSRPi.

At Step 250, the processor 120 generates a measurement reliability coefficient Coeff in accordance with the following equation:

$$\text{Coeff} = \log 2 \text{linear}(RSRPi - CRS\_RSSIi) \quad \text{(Equation 1)}$$

where Coeff is the measurement reliability coefficient, RSRPi is the intermediate reference signal power, and CRS_RSSIi is the intermediate CRS power. Thus the measurement reliability coefficient Coeff is generated by dividing the intermediate reference signal power RSRPi by the intermediate CRS power CRS_RSSIi in a linear domain. In other words, the measurement reliability coefficient Coeff is generated by subtracting the intermediate CRS power CRS_RSSIi from the intermediate reference signal power RSRPi in the log domain, and then transforming, using a look up table, the subtraction result into the linear domain. The measurement reliability coefficient Coeff is in a range between 0 and 1; the higher the coefficient, the better the channel condition.

At Step 260, the filter 130 generates a filtered reference signal power RSRP' in accordance with the following equation:

$$RSRP' = (\text{Coeff})*(RSRPi) + (1 - \text{Coeff})*(RSRP) \quad \text{(Equation 2)}$$

where RSRP' is the filtered reference signal power, Coeff is the measurement reliability coefficient, and RSRP is a previously-stored reference signal power. Equation 2 shows that the intermediate reference signal power RSRP' which has a higher measurement reliability has a larger weighting. The filter 130 may be a one-tap infinite impulse response filter, or any other filter suitable for the intended purpose. If the channel quality is good, the intermediate reference signal power RSRPi is close to the intermediate CRS power CRS_RSSIi, the coefficient is close to 1, and the intermediate reference signal power RSRPi has a larger weighting. If the channel quality is poor, the situation is the reverse. Thus there is adaptive weighting based on the channel quality to track the reference signal power RSRP within the measurement session.

Steps 230-260 are performed in a physical layer.

At Step 270 the previously-stored reference signal power RSRP is updated with the filtered reference signal power RSRP'.

At Step 280 it is determined whether the reference signal power report timer 150 has reached a predetermined time. If the reference signal power report timer has reached the predetermined time, at Step 290 the processor 120 reports the updated filtered reference signal power to a layer that is higher than the physical layer. Otherwise, Steps 220-260 are repeated.

The adaptive reference signal quality measurement tracking scheme described herein not only follows the reference signal power changes more accurately in a high mobility scenario, but also provides better noise and interference filtering. The reference signal power measurement filter can be implemented with minimal software cost, without any hardware cost, and can make the reported measurement results to the higher layer more accurately reflect the latest channel condition.

Example 1 is a method for filtering a power measurement of a reference signal received by a wireless communication device, the method comprising: measuring, with a receiver, a current reference signal power and a current cell specific reference signal (CRS) power of the reference signal; generating, by a processor, a measurement reliability coefficient based on the current reference signal power and the current CRS power; and filtering, by a filter, the current reference signal power using the generated measurement reliability coefficient to generate a filtered reference signal power, wherein the measuring, generating, and filtering are performed in a physical layer.

In Example 2, the subject matter of Example 1, further comprising: reporting the filtered reference signal power to a layer that is higher than the physical layer.

In Example 3, the subject matter of Example 1, wherein the reference signal is a Long Term Evolution (LTE) signal, and reference signal power is Reference Signal Received Power (RSRP).

In Example 4, the subject matter of Example 1, wherein the generating the measurement reliability coefficient comprises dividing the current reference signal power by the current CRS power in a linear domain.

In Example 5, the subject matter of Example 1, wherein the generating the measurement reliability coefficient comprises: subtracting the current CRS power from the current reference signal power in a log domain to obtain a subtraction result; and transforming, using a look up table, the subtraction result from the log domain into a linear domain.

In Example 6, the subject matter of Example 4, wherein the measurement reliability coefficient is generated by performing a log to linear operation on a difference of the current reference signal power and the current CRS power to obtain the measurement reliability coefficient.

In Example 7, the subject matter of Example 4, wherein the filtered reference signal power is generated by multiplying the measurement reliability filter coefficient by the current reference signal power to produce a first multiplication result, subtracting the measurement reliability coefficient from a value of one to obtain a subtraction result, multiplying the subtraction result with a previous reference signal power to obtain a second multiplication result, and adding the first multiplication result with the second multiplication result.

In Example 8, the subject matter of Example 1, further comprising: updating a stored reference signal power with the filtered reference signal power.

In Example 9, the subject matter of Example 8, further comprising: when a reporting timer reaches a predetermined time, reporting the filtered reference signal power to a layer that is higher than the physical layer.

In Example 10, the subject matter of Example 8, further comprising: prior to a reporting timer reaching a predetermined time, repeating the measuring, generating, and filtering steps.

In Example 11, the subject matter of Example 1, wherein the filter is an infinite impulse response filter.

Example 12 is a wireless communication device configured to filter a power measurement of a received reference signal, the wireless communication device comprising: a receiver configured to measure a current reference signal power and a current cell specific reference signal (CRS) power of the reference signal; a processor configured to generate a measurement reliability coefficient based on the current reference signal power and the current CRS power; and a filter configured to filter the current reference signal power using the generated measurement reliability coefficient to generate a filtered reference signal power, wherein the measuring, generating, and filtering are performed in a physical layer.

In Example 13, the subject matter of Example 12, wherein the processor is further configured to report the filtered reference signal power to a layer that is higher than the physical layer.

In Example 14, the subject matter of Example 12, wherein the reference signal is a Long Term Evolution (LTE) signal, and the reference signal power is Reference Signal Received Power (RSRP).

In Example 15, the subject matter of Example 12, wherein the processor is further configured to generate the measurement reliability coefficient by dividing the current reference signal power by the current CRS power in a linear domain.

In Example 16, the subject matter of Example 12, wherein the processor is further configured to generate the measurement reliability coefficient by subtracting the current CRS power from the current reference signal power in a log domain and transforming, using a look up table, the subtraction result from the log domain into a linear domain.

In Example 17, the subject matter of Example 15, wherein the processor is further configured to generate the measurement reliability coefficient is generated by performing a log to linear operation on a difference of the current reference signal power and the current CRS power to obtain the measurement reliability coefficient.

In Example 18, the subject matter of Example 15, wherein the processor is further configured to generate the filtered reference signal power by multiplying the measurement reliability filter coefficient by the current reference signal power to produce a first multiplication result, subtracting the measurement reliability coefficient from a value of one to obtain a subtraction result, multiplying the subtraction result with a previous reference signal power to obtain a second multiplication result, and adding the first multiplication result with the second multiplication result.

In Example 19, the subject matter of Example 12, wherein the processor is further configured to update a stored reference signal power with the filtered reference signal power.

In Example 20, the subject matter of Example 19, wherein when a reporting timer reaches a predetermined time, the processor is further configured to report the updated filtered reference signal power to a layer that is higher than the physical layer.

In Example 21, the subject matter of Example 19, wherein if a reporting timer has not reached a predetermined time, the receiver, processor, and filter are further configured to repeat the measuring, generating, and filtering, respectively.

In Example 22, the subject matter of Example 12, wherein the filter is an infinite impulse response filter.

Example 23 is a wireless communication device configured to filter power measurement of a received reference signal, the wireless communication device comprising: a receiving means for measuring a current reference signal power and a current cell specific reference signal (CRS) power of the reference signal; a processing means for generating a measurement reliability coefficient based on the current reference signal power and the current CRS power; and a filtering means for filtering the current reference signal power using the generated measurement reliability coefficient to generate a filtered reference signal power, wherein the measuring, generating, and filtering are performed in a physical layer.

In Example 24, the subject matter of Example 23, wherein the measurement reliability coefficient is generated by performing a log to linear operation on a difference of the current reference signal power and the current CRS power to obtain the measurement reliability coefficient.

Example 25 a computer program product embodied on a non-transitory computer-readable medium comprising program instructions configured such that when executed by processing circuitry cause the processing circuitry to implement the subject matter of Example 1.

In Example 26, the subject matter of Examples 1-2, wherein the reference signal is a Long Term Evolution (LTE) signal, and the reference signal power is Reference Signal Received Power (RSRP).

In Example 27, the subject matter of Examples 1-3, wherein the measurement reliability coefficient is generated by dividing the current reference signal power by the current CRS power in a linear domain.

In Example 28, the subject matter of Examples 1-4, wherein the measurement reliability coefficient is generated by: subtracting the current CRS power from the current reference signal power in a log domain; and transforming, using a look up table, the subtraction result from the log domain into a linear domain.

In Example 29, the subject matter of Examples 1-7, further comprising: updating a stored reference signal power with the filtered reference signal power.

In Example 30, the subject matter of Examples 1-8, wherein when a reporting timer reaches a predetermined time, further comprising: reporting the filtered reference signal power to a layer that is higher than the physical layer.

In Example 31, the subject matter of Examples 1-9, wherein if a reporting timer has not reached a predetermined time, further comprising: repeating the measuring, generating, and filtering steps.

In Example 32, the subject matter of Examples 1-10, wherein the filter is an infinite impulse response filter.

In Example 33, the subject matter of Examples 12-13, wherein the reference signal is a Long Term Evolution (LTE) signal, and the reference signal power is Reference Signal Received Power (RSRP).

In Example 34, the subject matter of Examples 12-14, wherein the processor is further configured to generate the measurement reliability coefficient by dividing the current reference signal power by the current CRS power in a linear domain.

In Example 35, the subject matter of Examples 12-15, wherein the processor is further configured to generate the measurement reliability coefficient by: subtracting the current CRS power from the current reference signal power in a log domain; and transforming, using a look up table, the subtraction result from the log domain into a linear domain.

In Example 36, the subject matter of Examples 12-18, wherein the processor is further configured to update a stored reference signal power with the filtered reference signal power.

In Example 37, the subject matter of Examples 12-19, wherein when a reporting timer reaches a predetermined time, the processor is further configured to report the updated filtered reference signal power to a layer that is higher than the physical layer.

In Example 38, the subject matter of Examples 12-19, wherein if a reporting timer has not reached a predetermined time, the receiver, processor, and filter are further configured to repeat the measuring, generating, and filtering, respectively.

In Example 39, the subject matter of Examples 12-21, wherein the filter is an infinite impulse response filter.

Example 40 is an apparatus substantially as shown and described.

Example 41 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for filtering a power measurement of a reference signal received by a wireless communication device, the method comprising:
    measuring, with a receiver, a current reference signal power and a current cell specific reference signal (CRS) power of the reference signal;
    generating, by a processor, a measurement reliability coefficient based on the current reference signal power and the current CRS power; and
    filtering, by a filter, the current reference signal power using the generated measurement reliability coefficient to generate a filtered reference signal power,
    wherein the measuring, generating, and filtering are performed in a physical layer, and wherein the generating the measurement reliability coefficient comprises:
  subtracting the current CRS power from the current reference signal power in a log domain to obtain a subtraction result; and
  transforming, using a look up table, the subtraction result from the log domain into a linear domain.

2. The method of claim 1, further comprising:
  reporting the filtered reference signal power to a layer that is higher than the physical layer.

3. The method of claim 1, wherein the reference signal is a Long Term Evolution (LTE) signal, and the current reference signal power is a Reference Signal Received Power (RSRP).

4. The method of claim 1, wherein the generating the measurement reliability coefficient comprises dividing the current reference signal power by the current CRS power in a linear domain.

5. The method of claim 4, wherein the measurement reliability coefficient is generated by performing a log to linear operation on a difference of the current reference signal power and the current CRS power to obtain the measurement reliability coefficient.

6. The method of claim 4, wherein the filtered reference signal power is generated by multiplying the measurement reliability filter coefficient by the current reference signal power to produce a first multiplication result, subtracting the measurement reliability coefficient from a value of one to obtain a subtraction result, multiplying the subtraction result with a previous reference signal power to obtain a second multiplication result, and adding the first multiplication result with the second multiplication result.

7. The method of claim 1, further comprising:
  updating a stored reference signal power with the filtered reference signal power.

8. The method of claim 7, further comprising:
  when a reporting timer reaches a predetermined time, reporting the filtered reference signal power to a layer that is higher than the physical layer.

9. The method of claim 7, further comprising:
  prior to a reporting timer reaching a predetermined time, repeating the measuring, generating, and filtering steps.

10. The method of claim 1, wherein the filter is an infinite impulse response filter.

11. A wireless communication device configured to filter a power measurement of a received reference signal, the wireless communication device comprising:
  a receiver configured to measure a current reference signal power and a current cell specific reference signal (CRS) power of the reference signal;
  a processor configured to generate a measurement reliability coefficient based on the current reference signal power and the current CRS power; and
  a filter configured to filter the current reference signal power using the generated measurement reliability coefficient to generate a filtered reference signal power,
  wherein the measuring, generating, and filtering are performed in a physical layer,
  wherein the processor is further configured to generate the measurement reliability coefficient by dividing the current reference signal power by the current CRS power in a linear domain, and
  wherein the processor is further configured to generate the filtered reference signal power by multiplying the measurement reliability filter coefficient by the current reference signal power to produce a first multiplication result, subtracting the measurement reliability coefficient from a value of one to obtain a subtraction result, multiplying the subtraction result with a previous reference signal power to obtain a second multiplication result, and adding the first multiplication result with the second multiplication result.

12. The wireless communication device of claim 11, wherein the processor is further configured to report the filtered reference signal power to a layer that is higher than the physical layer.

13. The wireless communication device of claim 11, wherein the reference signal is a Long Term Evolution (LTE) signal, and the current reference signal power is Reference Signal Received Power (RSRP).

14. The wireless communication device of claim 11, wherein the processor is further configured to generate the measurement reliability coefficient by subtracting the current CRS power from the current reference signal power in a log domain and transforming, using a look up table, the subtraction result from the log domain into a linear domain.

15. The wireless communication device of claim 11, wherein the processor is further configured to generate the measurement reliability coefficient by performing a log to linear operation on a difference of the current reference signal power and the current CRS power to obtain the measurement reliability coefficient.

16. The wireless communication device of claim 11, wherein the processor is further configured to update a stored reference signal power with the filtered reference signal power.

17. The wireless communication device of claim 16, wherein when a reporting timer reaches a predetermined time, the processor is further configured to report the updated filtered reference signal power to a layer that is higher than the physical layer.

18. The wireless communication device of claim 16, wherein prior to a reporting timer reaching a predetermined time, the receiver, processor, and filter are further configured to repeat the measuring, generating, and filtering, respectively.

19. The wireless communication device of claim 11, wherein the filter is an infinite impulse response filter.

20. A wireless communication device configured to filter power measurement of a received reference signal, the wireless communication device comprising:
  a receiving means for measuring a current reference signal power and a current cell specific reference signal (CRS) power of the reference signal;
  a processing means for generating a measurement reliability coefficient based on the current reference signal power and the current CRS power; and
  a filtering means for filtering the current reference signal power using the generated measurement reliability coefficient to generate a filtered reference signal power,
  wherein the measuring, generating, and filtering are performed in a physical layer,
  wherein the measurement reliability coefficient is generated by performing a log to linear operation on a difference of the current reference signal power and the current CRS power to obtain the measurement reliability coefficient.

21. A computer program product embodied on a non-transitory computer-readable medium comprising program instructions configured such that the instructions, when executed by processing circuitry, cause the processing circuitry to implement the method of claim 1.

* * * * *